United States Patent Office 3,449,079
Patented June 10, 1969

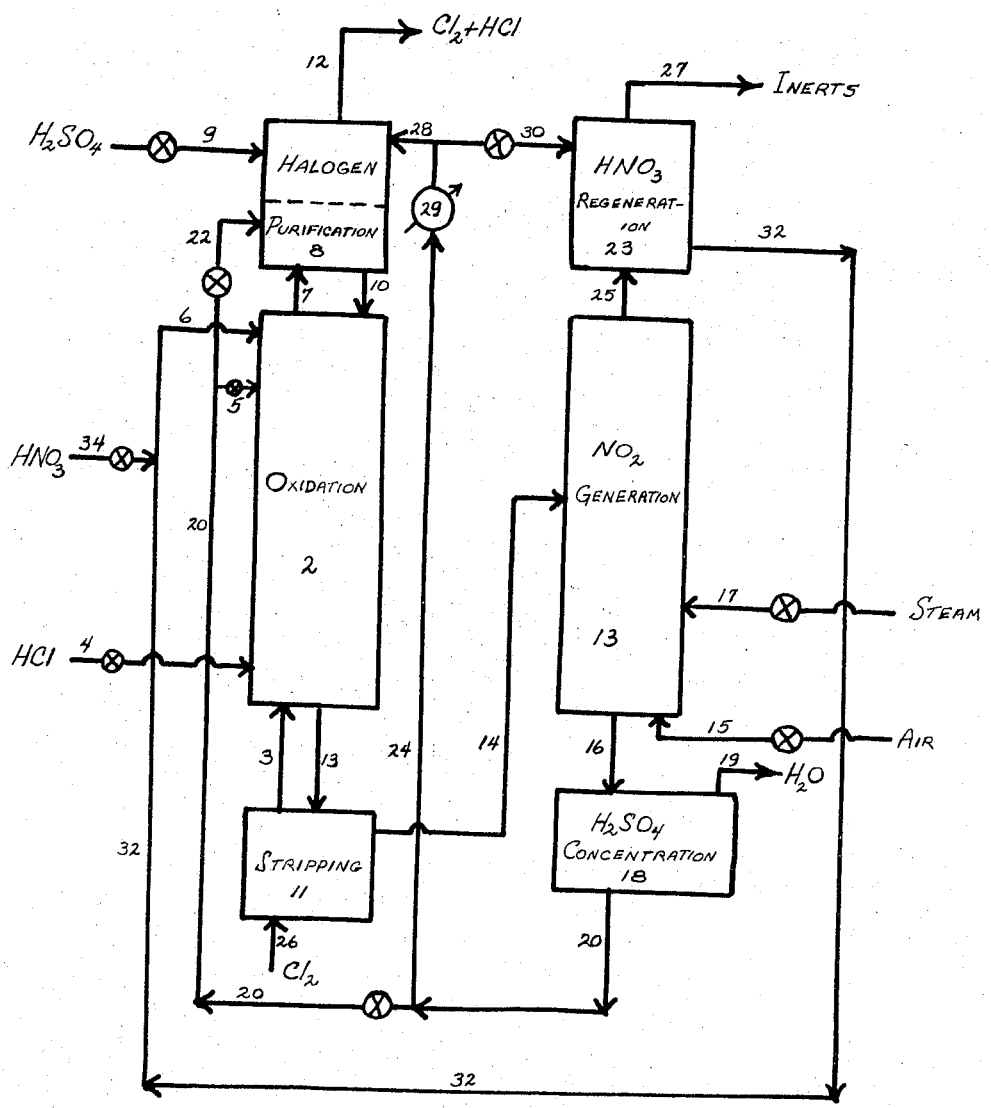

3,449,079
HYDROGEN HALIDE OXIDATION IN ACID MEDIUM
Huibert S. Jongenburger, Milltown, James P. Van Hook, Basking Ridge, and Christiaan P. van Dijk, Westfield, N.J., assignors to Pullman Incorporated, Chicago, Ill., a corporation of Delaware
Filed Feb. 6, 1967, Ser. No. 614,172
Int. Cl. C01b 7/10
U.S. Cl. 23—216          11 Claims

ABSTRACT OF THE DISCLOSURE

A process for halogen production by oxidation of a hydrogen halide with an aqueous nitric and sulfuric acid mixture wherein the initial concentration of sulfuric is at least 80 percent and wherein this initial concentration can vary not more than 8 percent during oxidation. The sulfuric is introduced into the oxidation zone in a weight ratio of at least 8:1 with respect to hydrogen halide and is maintained in excess with respect to the combined remaining acids in the oxidation zone. A vaporous product effluent is obtained from which product is separated and a liquid effluent is recovered and treated for regeneration of nitric and sulfuric acids.

---

This invention relates to a process for the production of halogen. More specifically, this process relates to the oxidation of hydrogen halide with nitric acid to produce halogen in a high state of purity and in one respect relates to a process for regenerating reactant mixtures in a hydrogen chloride oxidation process.

Many processes for the preparation of halogen have been proposed which involve the oxidation of an inorganic halide to produce halogen and water as a by-product of the reaction. However, the yield of halogen in these processes has been limited by the equilibria of the reversible reactions and, therefore, it has not been possible to obtain high conversions of the inorganic halide to halogen. Processes of high commercial value in the production of chlorine are the oxidation of hydrogen chloride represented in Equation 1 and the oxidation of nitrosyl chloride as represented in Equations 2 and 3 below.

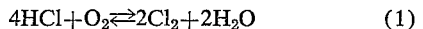
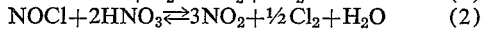
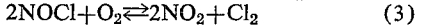

$$4HCl + O_2 \rightleftharpoons 2Cl_2 + 2H_2O \qquad (1)$$
$$NOCl + 2HNO_3 \rightleftharpoons 3NO_2 + \tfrac{1}{2}Cl_2 + H_2O \qquad (2)$$
$$2NOCl + O_2 \rightleftharpoons 2NO_2 + Cl_2 \qquad (3)$$

Since all of these reactions are reversible, the conversion of the chloride to the desired chlorine product is relatively low. Moreover, the presence of water, oxygen and/or substantial amounts of nitrogen dioxide in the reaction zone dilutes the chloride reactant and necessitates treatment of the reactor effluent in acid-resistant recovery zones in order to obtain substantially pure halogen product.

In the low temperature oxidation of hydrogen chloride with nitric acid in the presence of sulfuric acid it has been found that an excessive amount of nitrogen dioxide is formed which contaminates and is difficult to remove from the chlorine product. This process has not enjoyed commercial success by reason of the above difficulty and for the reason that, under the conditions of the process, a substantial portion of the hydrogen chloride reactant is usually entrained in the liquid sulfuric acid representing a potential loss of product. The known processes which employ hydrogen chloride, nitric acid and sulfuric acid require high dilution of the sulfuric during the reaction, e.g., about a 15 percent or higher dilution from the original concentration. This circumstance necessitates expensive and complicated reconcentration of sulfuric acid. The combination of these operating conditions results in the formation of nitrosyl chloride in the sulfuric solutions obtained in the process. It has been found that under the known conditions of operation, nitrosyl chloride leads to corrosion of the apparatus and is, therefore, considered an undesirable by-product in the oxidation of hydrogen chloride.

Therefore, it is an object of the present invention to provide a process for the production of halogen wherein these disadvantages are reduced or entirely eliminated.

Another object of this invention is to provide a commercial and economically feasible process for the production of chlorine or bromine from an inorganic chloride or bromide.

Another object is to provide a self-regenerating process for continuously producing halogen in a high state of purity which permits the use of an economic gas for regeneration of reaction components.

Another object is to provide a method for substantially complete conversion of hydrogen chloride to chlorine product.

Still another object is to provide a regeneration halide oxidation process wherein the oxidation medium is generated within the system.

These and other objects of the present invention will become apparent to those skilled in the art from the accompanying description and disclosure.

SUMMARY

According to the present invention, an inorganic halide selected from the group consisting of hydrogen chloride and hydrogen bromide is oxidized at a high temperature with an oxidation medium comprising a mixture of nitric acid and sulfuric acid of at least about 80 percent concentration, and under conditions such that the halogen is formed with the continuous production of nitrosyl sulfuric acid as the major by-product of the reaction. To maintain the continuous production of this by-product, the concentration of the sulfuric acid should not be permitted to fall more than 8 percent during the oxidation reaction. In the present process, the feed to the reaction zone, substantially devoid of oxygen, is maintained at a critical minimum hydrogen halide to sulfuric acid weight ratio of at least 1:8 and preferably between about 1:10 and about 1:50, most preferably between 1:10 and 1:25 in the oxidation mixture. The amount of nitric acid fed to the oxidation zone is between about 0.3 and 0.7, preferably between 0.35 and 0.55, mole per mole of hydrogen halide. The vaporous product effluent and the liquid effluent of the oxidation reaction are treated for recovery of product and regeneration of reaction components.

The oxidation reaction and separation and recovery of halogen product is preferably carried out in a multi-stage contactor. However, it is to be understood that in place of a single contactor, a series of separate contactors may be employed. In the initial contacting zone, the instant high sulfuric oxidation process is carried out at temperatures between about 100° C. and about 200° C., preferably between about 140° C. and about 175° C. under pressures ranging from about 0 to about 400 p.s.i.g.

As stated above, a sulfuric acid concentration of at least about 80 percent sulfuric is fed to the oxidation zone and this lower limit is critical in avoidance of undesirable hydrogen halide entrainment in the liquid sulfuric medium. However, higher concentrations of sulfuric up to 100 percent acid are advantageous and even preferred in the present process. It is also important that an excess of sulfuric with respect to the remaining acids in the system is maintained at all times during oxidation. The advantage of maintaining the excess of sulfuric acid within a narrow range of concentration during oxidation is that only by such conditions can a gaseous halogen product be isolated in a high state of purity (i.e., substantially devoid of oxygen and oxide of nitrogen contamination). In order to insure the high sulfuric concentration and substantially complete absorption of oxide of nitrogen in the sulfuric phase, a relationship between acid concentrations of the sulfuric and nitric acids should be observed. The nitric acid should not be so dilute that the total water concentration of the combined acid phases would exceed 25 percent of the weight of the sulfuric.

Thus, the halogen product of the present process can be removed as a gaseous effluent from the initial contacting or oxidation zone containing a small amount, e.g., less than 2 percent nitrogen dioxide. This gaseous effluent is removed from the initial contacting zone and is subjected to additional treatment for purification of halogen with sulfuric acid of at least about 80 percent concentration such as, for example, by countercurrent contacting of the acid and halogen gas in a second contacting or finishing zone. It is to be understood that both the first and second contacting zone may be operated in a plurality of stages in the same or in separate contacting apparatus. The final part of the finishing step is preferably carried out at a lower temperature, e.g., at ambient temperature to effectively dry the product halogen and hydrogen halide gas mixture.

The liquid effluent from the oxidation zone containing sulfuric acid, nitrosyl sulfuric acid and water is withdrawn and treated in a separate zone, or a nitrogen oxide generation zone, at a temperature between about 170° C. and about 250° C. with a mixture of air and steam to initially convert nitrosyl sulfuric acid to a mixture of nitrogen oxides (e.g., NO and $NO_2$). Upon further contact or oxidation with air or oxygen, the mixture is predominantly converted to $NO_2$. In cases where the acid phase from the oxidation zone (i.e., the solution of sulfuric and nitrosyl sulfuric acid) contains a small amount of hydrogen halide, the acid phase can be stripped with halogen prior to air and steam stripping to recover the hydrogen halide, if desired. In this case the halide stripping gas effluent is combined with the gaseous effluent from the oxidation zone or returned to the oxidation zone.

The aqueous sulfuric acid remaining after air and steam stripping is then vacuum flashed or air stripped at a temperature between about 125° C. and about 200° C. to reconcentrate the sulfuric for recycle to the second contacting or finishing zone. If desired, the air and steam stripping can be carried out in separate zones or additional oxidation of NO to $NO_2$ with air can be effected in a separate zone which follows the steam stripping. It is also possible to generate steam from the acid itself by heat input at a lower part of the column.

The gaseous fraction obtained from the air-steam stripping is then subjected to one of two treatments. Either the gaseous fraction is directly washed with cold sulfuric acid to provide the liquid oxidation mixture of sulfuric acid, nitric acid and nitrosyl sulfuric acid which is recycled to the initial contacting zone or the gaseous fraction is first treated with water to convert a portion of the nitrogen dioxide to nitric acid until the acid concentration in the resulting liquid mixture (a first liquid mixture), is between about 45 and 70 percent. In the latter case, the remaining gaseous fraction containing nitrogen oxide and nitrogen dioxide is then separately washed with the cold sulfuric acid to provide a second liquid mixture of sulfuric, nitrosyl sulfuric, and nitric acids. The first and second liquid mixtures are then combined as recycle feed to the initial contacting zone as the regenerated oxidation medium after addition of fresh nitric acid make up. Either of the above washing procedures may be employed depending upon the desired nitric acid concentration in the recycle feed. For example, in some cases it is advantageous to form the nitric acid in situ by the water wash treatment to increase the nitric concentration in the recycle feed; however, when the concentration of nitric in the gaseous fraction is adequate, or when it is desirable to add a major portion of the nitric acid from an outside source as fresh feed to provide the proper concentration required in the oxidation medium in the initial contacting zone, the water treatment can be eliminated and the gaseous fraction simply washed with cold sulfuric acid to provide recycle. In either of the above treatments, certain inert gases, such as nitrogen and air, remain uncondensed in the cold acid washing zone. These inert gases are vented from the system in the cold acid washing step.

The temperature of the sulfuric acid in the cold sulfuric acid solution entering the second contacting zone at the final stage of effluent contacting is maintained at least 35° below the oxidation temperature of the reaction and the cold wash is preferably effected at a temperature between about 30° C. and about 55° C. It is to be understood, however, that as the absorption solution passes downwardly in the finishing zone in contact with the rising product gases, it is heated to a temperature at which oxides of nitrogen are more effectively removed from the chlorine product. Therefore, it is desirable to add a portion of the $H_2SO_4$ absorption solution to an intermediate portion of the secondary contacting zone at a temperature which more closely approximates the temperature of reaction in the initial contacting zone.

An important advantage of the present process is obtained from the manner of regenerating the nitric acid reactant from the liquid effluent of the initial contactor. Since, in the regeneration of the nitric acid, gaseous nitrogen oxide and nitrogen dioxide are formed in the substantial absence of entrained hydrogen halide, the formation of the corrosive nitrosyl halide solution is avoided. Thus, corrosion problems which have plagued previous hydrogen halide-nitric oxidation processes do not exist in the present process. The acid concentrations of the sulfuric and nitric acids and the oxidation temperature are factors which provide for a complete separation of halogen product in the vapors from the liquid oxidation effluent and which provide some of the significant benefits of the present process. Since the halogen is substantially insoluble in the nitrosyl sulfuric acid and in the sulfuric acid of at least 80 percent acid concentration at temperatures of 100° C. and above, it is not dissolved in the liquid effluent. It has been found, however, at lower temperatures and lower sulfuric acid concentration, that although halogen is insoluble, solubility of the hydrogen halide increases so that significant portions of this reactant are lost to the liquid effluent. This increased solubility also leads to the formation of nitrosyl chloride and to corrosion in the later stages of the process where nitrogen oxide decomposition products appear in more concentrated amounts.

The following Table I compares the solubility of standard cubic feet of hydrogen chloride per cubic foot of sulfuric solution at 1 atmosphere HCl pressure, at various temperatures and at various sulfuric concentrations:

| Sulfuric acid concentration, percent | $1/T°$ K.[2] | | | |
|---|---|---|---|---|
| | 2.92 | 3.19 | 3.35 | 3.44 |
| 66 | 5.2 | 11.5 | [1] 22 | 32 |
| 75 | | [1] 2.5 | 5.0 | |
| 83 | .33 | .30 | [1] 0.66 | .77 |

[1] Derived values.
[2] Temperature in degrees Kelvin.

For a better understanding of the present invention reference is now had to the drawing wherein a specific embodiment of the present process is described. It is to be understood, however, that the present invention is not limited by the specific and detailed description which follows and that many modifications and variations of the embodiment described will become apparent to those skilled in the art without departing from the scope of this invention.

Into the lower portion of stirred oxidation zone 2, operated at a temperature of 150° C. under 30 p.s.i.g., is fed 81 pound moles of hydrogen chloride from valved line 4 and a liquid mixture of 23,404 pounds of 82.6 percent sulfuric acid, 32 pound moles of nitrosyl sulfuric acid and 30 pound moles of nitric acid from line 6. Into the upper portion of oxidizer 2 is fed 12,739 pounds of sulfuric acid of 84.2 percent acid concentration and 16.5 pound moles of nitrosyl sulfuric acid from line 10 for countercurrent contact with hydrogen chloride gas. An overall mole ratio of sulfuric acid to nitric acid of about 10:1 entering oxidizer 2 is maintained. Nitric and sulfuric make up is fed from valved lines 34 and 9, respectively.

In oxidizer 2 hydrogen chloride is oxidized to chlorine gas by the oxidizing mixture containing nitric acid until substantially complete conversion of the hydrogen chloride takes place. Product chlorine and reactant hydrogen chloride pass upwardly in oxidizer 2 and 36 pound moles of chlorine gas product containing 1 pound mole of nitrogen dioxide, 5.6 pound moles of hydrogen chloride, 4 pound moles of water vapor and 15.5 pound moles of gaseous nitrosyl chloride which fails to be reacted with the sulfuric acid solution in the top of oxidation zone 2, is withdrawn as the vaporous effluent from oxidizer 2 by means of line 7. This vaporous effluent is passed to a hot zone of halogen purification tower 8 for countercurrent contact at an elevated temperature with 12,486 pounds of 84.6 percent sulfuric acid from valved line 22 and with 1854 pounds of 83.9 percent sulfuric from the upper cooler portion of the tower. The contact temperature in the hot zone varies between 135° C. at the bottom and 105° C. at the top and the nitrosyl chloride is converted to hydrogen chloride and nitrosyl sulfuric acid. In the lower hot portion of purification 8 the oxide-containing nitrogen compounds are absorbed and/or reacted in the hot liquid sulfuric acid and returned to oxidizer 2 through line 10, while 57 pound moles of gaseous hydrogen chloride-chlorine mixture containing 3 pound moles of water vapor is passed to the upper portion of purification tower 8, operated at a temperature at least 50° below the oxidation temperature (e.g., 38° C.). In the upper portion of the purification tower the water is condensed in 1800 pounds of 86.4 percent sulfuric acid entering tower 8 from lines 9 and 28 and 36 pound moles of chlorine and 21 pound moles of hydrogen chloride is removed as a gaseous mixture from the top of the purifier by means of product recovery line 12 under a pressure of about 27 p.s.i.g. The resulting liquid, 1854 pounds of 83.9 percent sulfuric acid containing absorbed water, is passed downwardly into the hot zone of purification tower 8 for contact with the reactor effluent gases. The mole ratio of sulfuric acid to chlorine in tower 8 can vary between about 2:1 and 35:1, however, in the present example a ratio of 3.5:1 is employed in purifier 8 for countercurrent contact with the gaseous effluent.

The liquid effluent from oxidizer 2 comprising 35,130 pounds of 81.2 percent sulfuric acid, 64 pound moles of nitrosyl sulfuric acid, 0.1 pound mole of hydrochloric acid, and a trace amount of nitric acid is removed in line 13 and passed to hydrochloric acid stripper 11 wherein at a temeprature of 148° C. under 31 p.s.i.g. the liquid effluent is stripped with 6 pound moles of chlorine from valved line 26 and the vapors returned to oxidation zone 2. The remaining stripped liquid effluent is then passed to nitrogen dioxide generator 13 by means of line 14.

Into nitrogen dioxide generator 13 operated at a temperature of up to 200° C. under 32 p.s.i.g. is also fed 100 pound moles of air and 115 pound moles of steam from valved lines 15 and 17, respectively. The nitrosyl sulfuric acid in the liquid effluent is oxidized by the air-steam gaseous mixture and converted to 62 pound moles of nitrogen dioxide containing nitrogen oxide (2 pound moles), inerts (85 pound moles), and steam (30 pound moles) as a gaseous fraction in the upper portion of zone 13. During the conversion, the gaseous effluent is cooled 750,000 B.t.u./hr. The remaining liquid, comprising 42,896 pounds of 81.1 percent aqueous sulfuric acid passes to the bottom of zone 13 from where it is removed as a liquid fraction by means of line 16 and thence passed to sulfuric acid concentrator 18 operating at a temperature of about 175° C. under 2 p.s.i.a. The aqueous 81.1 percent sulfuric acid is dried to an acid concentration of 86.4 percent and 145 pound moles of water vapor is vented by means of valved line 19. A minor portion, in this example 1800 pounds of the 40,286 pounds of 86.4 percent sulfuric acid, is withdrawn from zone 18 and recycled to oxidizer 2 by means of lines 20 and 5; or recycled to the lower portion of purifier 8 by means of lines 20 and 22 after adjusting the temperature to the level required in these zones. Any sulfuric loss to the system can be replaced by fresh 87 percent sulfuric acid feed from valved line 9. The remaining major portion of dried sulfuric acid is passed from line 20 to line 24 and into cooler 29.

The gaseous fraction removed from generator 13, which in addition to oxide of nitrogen and inerts also contains water and the stripping air, is passed to the lower portion of nitric acid regenerator 23 by means of line 25, for countercurrent contact with 26,000 pounds of dried 86.4 percent sulfuric acid from valved line 30 which has been cooled in cooler 29 to a temperature of 38° C. In regenerator 23 the oxides of nitrogen are converted to nitric acid and nitrosyl sulfuric acid at a temperature of between 40° C. and 60° C. under 30 p.s.i.g. The inert materials are vented from the regenerator by means of line 27. The regenerated nitric acid, nitrosyl sulfuric acid and sulfuric acid liquid mixture is withdrawn from zone 23 by means of line 32 and the oxidation mixture is recycled to oxidizer 2 from lines 32 and 6 after adjusting the temperature to that required in the oxidation zone.

Many modifications and variations of the embodiment described above can be made without departing from the scope of this invention. For example, if desired, regenerator zone 23 can be replaced by a conventional nitric acid tower in which $NO_2$ and NO are oxidized to nitric acid solution in water and from which water and inert gases in line 27 can be discarded as a gaseous effluent. It is also possible in the above-described process to eliminate halogen purification zone 8 and to recover a chlorine-hydrogen chloride mixture of more than 99 percent purity from line 7. In this case a greater excess of sulfuric acid entering the top of oxidizer 2 is provided and a more concentrated sulfuric acid, for example, about 95 percent acid concentration, is employed. As still another alternative, halogen purificaton can be effected by passing the vaporous effluent from oxidizer 2 into a hot sulfuric acid absorber and then into a separate cold sulfuric acid drying zone.

It is also to be understood that in place of air, ozone or oxygen may be supplied to the system through valved lines 15 and 19 or the air may be partially mixed with a portion of oxygen in either of the stripping zones described.

In the above-described example the sulfuric acid in recycle line 32 can be at a lower concentration than the fresh sulfuric feed entering the system through valved line 9. However, the concentration of the sulfuric entering the oxidation zone must be at a concentration of at least 80 weight precent acid content. These and many other modifications of the present process will become apparent to those skilled in the art without departing from the scope of this invention.

Having described our invention, we claim:

1. In a process of producing chlorine or bromine by the oxidation of the corresponding hydrogen halide with nitric acid in the presence of sulfuric acid in a reaction zone, the improvement which comprises:

(1) introducing a mixture of nitric, nitrosyl sulfuric, and sulfuric acids, wherein the sulfuric acid utilized in the mixture has a sulfuric acid concentration of at least 80%, into an oxidation zone and contacting the mixture with hydrogen chloride or hydrogen bromide substantially in the absence of oxygen;

(2) maintaining the mole ratio of nitric acid introduced into the oxidation reaction zone not in excess of 0.7:1 with respect to the hydrogen halide;

(3) maintaining a sulfuric acid ratio of at least 8:1 with respect to the hydrogen halide;

(4) oxidizing the hydrogen halide while maintaining an excess of sulfuric acid with respect to the remaining acids in the oxidation reaction zone;

(5) controlling the concentration of the sulfuric acid to vary not more than 8 percent from the original concentration during oxidation; and (6) separately recovering a vaporous product effluent containing the halogen and a liquid effluent from the oxidation zone.

2. The process of claim 1 wherein a mol ratio of nitric to hydrogen halide of between about 0.3:1 and about 0.7:1 is fed to the oxidation zone and wherein the oxidation reaction is carried out at a temperature between 100° C. and 200° C.

3. The process of claim 1 wherein the weight ratio of hydrogen halide to sulfuric acid introduced into the oxidation zone is between 1:10 and 1:50.

4. The process of claim 1 wherein the sulfuric acid has an initial acid concentration of between 83 percent and 95 percent based on total water of the aqueous oxidation mixture.

5. The process of claim 1 wherein the vaporous product effluent is countercurrently contacted with the aqueous sulfuric acid of at least 80 percent concentration at decreasing temperatures of at least 35° below the oxidation temperature and the aqueous sulfuric acid is withdrawn after contacting the effluent and passed to the oxidation zone as at least part of the sulfuric acid fed thereto.

6. The process of claim 5 wherein a mol ratio of sulfuric acid to halogen in the vaporous effluent is maintained between 2:1 and 35:1, the gaseous product effluent is dried by contact with said aqueous sulfuric acid at a final temperature of between about 20 to 55° C.

7. The process of claim 1 wherein the liquid effluent containing sulfuric acid, water, and nitrosyl sulfuric acid is withdrawn from the oxidation zone, contacted with a gaseous mixture of air and steam at a temperature of between 170° C. and 250° C. in an oxide of nitrogen generation zone to provide a gaseous fraction of said oxides of nitrogen and a liquid fraction of a dilute aqueous sulfuric acid, washing the gaseous fraction with a sulfuric acid of at least 80 percent acid concentration at a temperature of at least 35° below oxidation temperature in a nitric regeneration zone to convert oxides of nitrogen to nitrosyl sulfuric acid and nitric acid and recycling the resulting mixture of sulfuric, nitric and nitrosyl sulfuric acids to the oxidation zone at the temperature employed therein.

8. The process of claim 7 wherein the liquid effluent from the oxidation zone also contains a small amount of hydrogen halide and wherein the liquid effluent is stripped with halogen prior to passing said liquid effluent to the oxide of nitrogen generation zone.

9. The process of claim 7 wherein the gaseous fraction from the oxide of nitrogen generation zone is contacted with water to convert a minor portion of said oxide of nitrogen to nitric acid prior to washing with said sulfuric acid at reduced temperature.

10. The process of claim 7 wherein the aqueous fraction of dilute sulfuric acid is vacuum flashed at a temperature between 125° C. and 200° C. to reconcentrate said acid to at least 80 percent acid concentration and the reconcentrated acid is recycled to the drying zone and cold sulfuric acid washing zones at the temperatures required therein.

11. The process of claim 7 wherein the sulfuric acid introduced into the nitric regeneration zone is at a temperature between 20 and 55° C.

References Cited

UNITED STATES PATENTS

| 1,310,943 | 7/1919 | Datta | 23—219 |
| 2,793,102 | 5/1957 | Frischer | 23—219 |
| 2,855,279 | 10/1958 | Walter | 23—219 |
| 3,152,870 | 10/1964 | Baumgartner et al. | 23—219 |
| 3,201,201 | 8/1965 | Van Dijk et al. | 23—219 |

OSCAR R. VERTIZ, Primary Examiner.

G. O. PETERS, Assistant Examiner.

U.S. Cl. X.R.

23—219